(12) United States Patent
Matthews et al.

(10) Patent No.: US 10,067,690 B1
(45) Date of Patent: Sep. 4, 2018

(54) SYSTEM AND METHODS FOR FLEXIBLE DATA ACCESS CONTAINERS

(71) Applicant: Innovium, Inc., San Jose, CA (US)

(72) Inventors: William Brad Matthews, San Jose, CA (US); Bruce H. Kwan, Sunnyvale, CA (US); Mohammad K. Issa, Los Altos, CA (US); Neil Barrett, Palo Alto, CA (US); Avinash Gyanendra Mani, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 34 days.

(21) Appl. No.: 15/283,063

(22) Filed: Sep. 30, 2016

(51) Int. Cl.
*G06F 12/00* (2006.01)
*G06F 3/06* (2006.01)
*G06F 12/02* (2006.01)
*H04L 29/08* (2006.01)

(52) U.S. Cl.
CPC ............ *G06F 3/0613* (2013.01); *G06F 3/067* (2013.01); *G06F 3/0631* (2013.01); *G06F 3/0638* (2013.01); *G06F 3/0656* (2013.01); *G06F 12/023* (2013.01); *G06F 2212/1021* (2013.01); *H04L 67/10* (2013.01)

(58) Field of Classification Search
CPC ...... G06F 3/065; G06F 3/0608; G06F 3/0656; G06F 3/0683; G06F 3/0647; G06F 12/0891
See application file for complete search history.

(56) References Cited

U.S. PATENT DOCUMENTS 6,259,459 B1 * 7/2001 Middleton ................ G06T 1/60
345/503
2017/0083438 A1 * 3/2017 Han ..................... G06F 12/0292

* cited by examiner

*Primary Examiner* — Midys Rojas
(74) *Attorney, Agent, or Firm* — Fish & Richardson P.C.

(57) ABSTRACT

A memory system for a network device is described. The memory system includes a packing data buffer including a plurality of memory banks arranged in a plurality of rows and a plurality of columns. The packing data buffer is configured to store incoming data elements of a plurality of widths in the plurality of memory banks. The memory system also includes a free address manager configured to generate an available bank set based on one or more free memory banks in the plurality of memory banks. And, the memory system includes distributed link memory configured to maintain one or more pointers to interconnect a set of one or more memory locations of the one or more memory banks in the packing data buffer to generate at least one list.

22 Claims, 5 Drawing Sheets

SYSTEM AND METHODS FOR FLEXIBLE DATA ACCESS CONTAINERS

FIELD

Embodiments of the invention relate to network devices. In particular, embodiments of the invention relate to memory systems for network devices.

BACKGROUND

Network devices are used to transfer data between nodes in a network. As the networks grow and the data rates of communication channels increase, the need to increase the amount of data a network device can handle within a period of time arises. Further, the network devices receive variable length packets, whose size commonly ranges from 64 bytes to 9 kilobytes. Receiving a wide range of packet widths is problematic for current network devices as they are constructed using internal memories and processing units based on a fixed storage data element width, which is considerably smaller than the large packet width received on the network. In particular, sizing the internal memories and processing units to be equal in size to the maximum transmission unit (MTU) is cost prohibitive. Thus, current network devices use fixed width data units for internal storage and processing.

Because current network devices use fixed width data units for internal storage and processing, determining the width of the data units that is to be used is a key problem. The width of the data unit is determined by the required throughput at a given frequency. This results in having network device designed for a data unit that is optimized for high throughput processing. However, the cost for this optimization results in the cost of high overhead bandwidth and specialized components. Moreover, the network device is inflexible to meet changes in the network. Because the network devices are for a specific throughput, the network device would be overdesigned in networks having a lower throughput requirement, and would be under designed for a network that uses larger packet widths. Thus, the current network devices are not equipped to handle efficiently a network with variable width data packets.

SUMMARY

A memory system for a network device is described. The memory system includes a packing data buffer including a plurality of memory banks arranged in a plurality of rows and a plurality of columns. The packing data buffer is configured to store incoming data elements of a plurality of widths in the plurality of memory banks. The memory system also includes a free address manager configured to generate an available bank set based on one or more free memory banks in the plurality of memory banks. And, the memory system includes distributed link memory configured to maintain one or more pointers to interconnect a set of one or more memory locations of the one or more memory banks in the packing data buffer to generate at least one list.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a system and methods for implementing hardware data packing for network devices are described. In particular, a memory system is described that is configured to manage data received by one or more input sources by implementing a memory system including a packing data buffer. The packing data buffer including an array of memory banks. The packing data buffer is configured to provide data storage for multiple write sources and multiple read sources at a time. Further, the packing data buffer is configured to store incoming data elements of variable widths as one or more storage data elements. The memory system includes a free address manager configured to generate a buffer available bank set to locate available memory banks. The memory system also includes distributed-link memory. The distributed-link memory is configured to track the locations of data stored in the packing data buffer and bind the locations to a list to maintain a sequential relationship between the data.

Such an architecture provides the ability to store variable width incoming data elements, while minimizing unused memory and maximizing read/write bandwidth. In addition, the architecture minimizes the overhead needed to manage access to the memory. The architecture also provides the use of single port memory and lower operating frequencies which lowers the cost and complexity of the memory system while still meeting the performance demands of a high capacity network.

Figure 1:
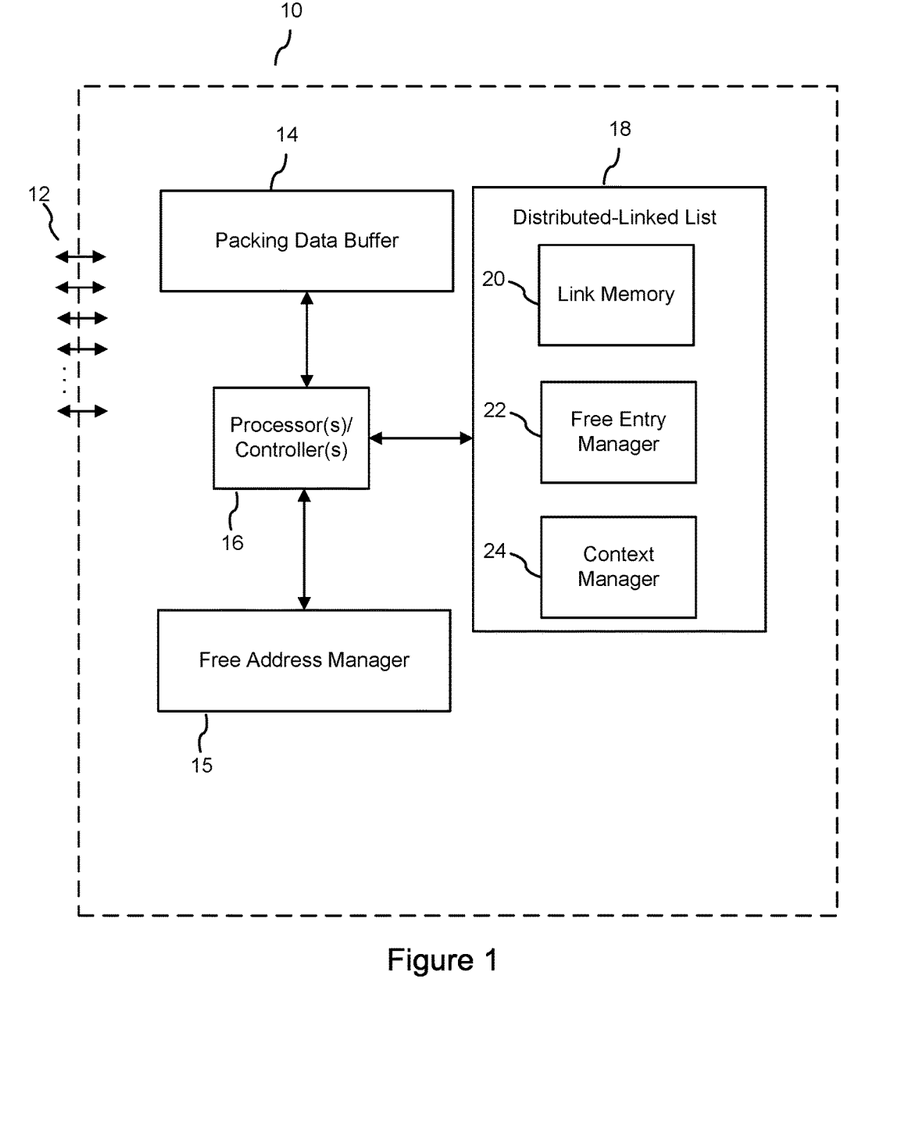
FIG. 1 illustrates a block diagram of a network device including a memory system including a packet data buffer according to an embodiment.

FIG. 1 illustrates a block diagram of a network device including a memory system including a packing data buffer according to an embodiment. Specifically, FIG. 1 illustrates a network device 10 including a plurality of input/output ports 12. Data packets are received and transmitted through the ports 12 using techniques including those known in the art. The ports 12 are coupled with a packing data buffer 14. A packing data buffer 14 may include memory technologies including, but not limited to, dynamic random-access memory ("DRAM"), static random-access memory ("SRAM"), flash memory, and other technologies used to store data including those known in the art.

The packing data buffer 14 is coupled with one or more processors 16. A processor 16 may include, without limitation, a central processing unit ("CPU"), a controller, an application-specific integrated circuit ("ASIC"), field-programmable gate arrays ("FPGA"), or other types of control units. The one or more processors 16 are configured to manage access to the packing data buffer 14 using techniques including those known in the art. For example, the one or more processors 16 are configured to determine a location to store data received on one or more ports 12. The one or more processors 16 are also configured to read data stored in the packing data buffer 14 when the data is to be transmitted on one or more ports 12. Further, the one or more processors 16 are configured to overwrite, update, and invalidate memory locations using techniques including those known in the art.

The memory system also includes a free address manger 15. The free address manager 15 is configured to generate a buffer available bank set of locations in the packing data buffer 14. The buffer available bank set is a group of one or more addresses in the packing data buffer 15 that are not in use or allocated. For an embodiment, the buffer available bank set includes a plurality of buffer free lists. For example, the buffer available bank may include a buffer free list for each memory bank in the packing data buffer 14. Each buffer free list in the buffer available bank is configured to maintain a list of one or more addresses for one or more locations in a packing data buffer 14 that are not used or allocated for storing one or more storage data elements.

For an embodiment, a free address manager 15 uses one or more memory technologies including those known in the art. For an embodiment, the one or more processors 16 are configured to remove an address of a memory bank location from the available bank set when a memory bank location in the packing data buffer 14 is used or allocated for an access, such a read access or a write access. Further, the one or more processors 16 are configured to add an address of a memory bank location to an available bank set generated by a free address manager 15 after the memory bank location is no longer in use or allocated for an access. For example, once a storage data element is read from the packing data buffer 14, the one or more processors 16 are configured to deallocate or invalidate a location of a memory bank associated with the storage data element, which includes writing the address of the location in the free address manager 15.

Further, the embodiment illustrated in FIG. 1 includes a distributed-linked list 18. The distributed-linked list 18 is coupled with one or more processors 16. The distributed-linked list 18 includes a link memory 20, a free entry manager 22, and a context manager 24. The link memory 20 is configured to maintain metadata to interconnect storage data elements stored in the main memory 14. For an embodiment, maintaining metadata includes generating, storing, and updating metadata using techniques including those described herein. In addition, the link memory 20 is configured to store metadata including one or more pointers to reference storage data elements stored in the packet data buffer 14. The link memory 20 may include one or more of the memory technologies as described herein. The link memory 20 includes a plurality of locations for storing information. Each of the plurality of locations has an address used to access data stored in the location. For an embodiment, link memory 20 includes a plurality of memory banks with each of the memory banks including a plurality of locations and each location having an address used to access data.

A distributed-linked list 18, according to the embodiment illustrated in FIG. 1, also includes a free entry manager 22. The free entry manager 22 is configured to generate an available bank set of locations in the link memory 20. The available bank set is a group of one or more addresses in the link memory 20 that are not in use or allocated. For an embodiment, the one or more addresses reside in different memory banks of the link memory. For example, the free entry manager 22 is configured to maintain a list of one or more addresses of the locations in link memory 20 that are not used or allocated for storing metadata for a storage data element or a portion thereof currently stored in the packing data buffer 14 as an available bank set. For an embodiment, a free entry manager 22 uses one or more memory technologies including those known in the art for storing an available bank set. For an embodiment, the one or more processors 16 are configured to remove a link memory address from the free entry manager 22 when a link memory address is used or allocated to interconnect storage data elements of the portion thereof stored in a packing data buffer 14. Further, the one or more processors 16 are configured to add a link memory address to the free entry manager 22 after the link memory address is no longer in use. For example, once a set of one or more storage data elements associated with the link memory is read from packing data buffer 14, the one or more processors 16 are configured to deallocate or invalidate a location of link memory 20 associated with the storage data element or a portion thereof, which includes writing the address of the location in the free entry manager 22.

According to the embodiment illustrated in FIG. 1, the distributed-linked list includes a context manager 24. The context manager 24 is configured to maintain metadata including pointers that interconnect one or more storage data elements stored in the packet data memory 14. For an embodiment, the context manager 24 maintains metadata including a head address, or the address in the link memory 20 for the first entry in a list, and a tail address, the address in the link memory 20 for the last entry in the list stored in the link memory 20. For an embodiment, the memory system implements a distributed-linked list as described herein provides the benefit of delinking the packet data buffer from the link memory. The delinking provides the use of more efficient memory technologies and architecture including, but not limited to, using single port memory and using memory with lower clock rates. This provides the use of lower cost memory technologies and lower power consumption while meeting the needs of a high-speed, high-capacity network device.

Figure 2:
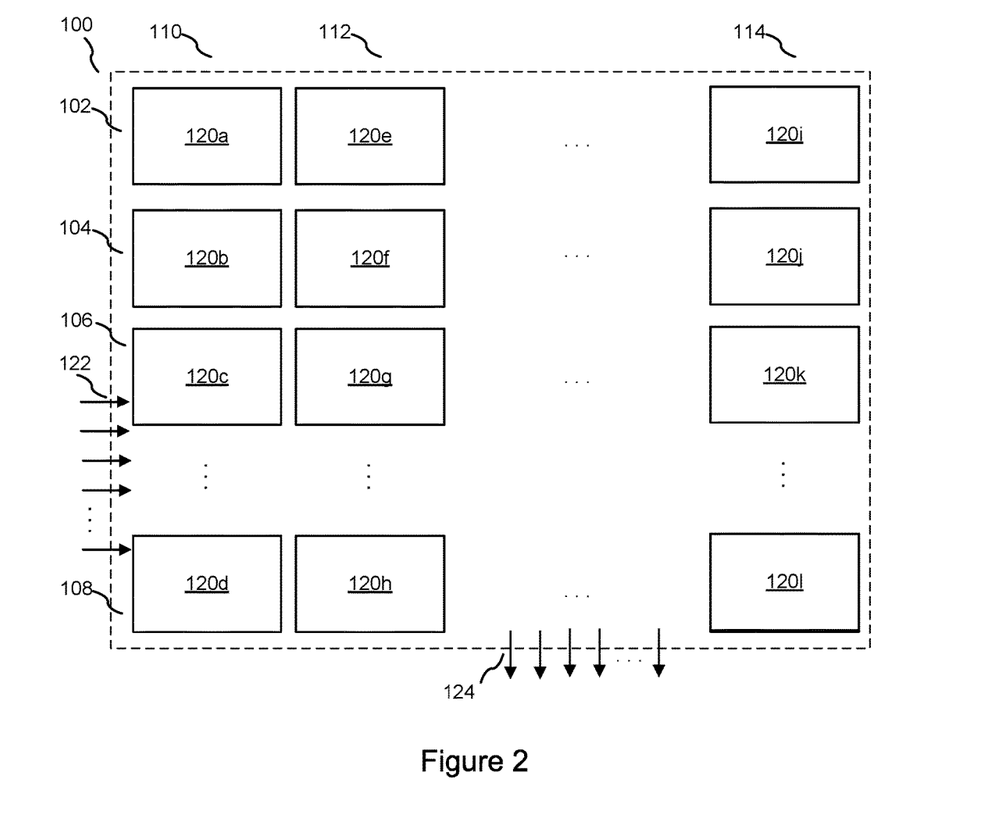
FIG. 2 illustrates a block diagram of a packing data buffer according to an embodiment.

FIG. 2 illustrates a block diagram of a packing data buffer according to an embodiment. The packing data buffer 100, according to the embodiment illustrated in FIG. 2, is formed as a two-dimensional array of memory banks 120a-1. The two-dimensional array includes a plurality of memory banks 120a-1 arranged into a number of rows 102, 104, 106, 108 and a number columns 110, 112, 114. For an embodiment, the plurality of memory banks 120a-1 include one or more locations within each memory bank for storing data. Each memory location having a fixed data width. As one skilled in the art would understand, the number of rows and columns of the packing data buffer 100 and the data width of each location within the memory banks 120a-1 may be configured to maximize the utilization of each memory bank, to achieve a desired throughput rate, or to otherwise optimize the memory system to have the desired operation characteristics using techniques including those known in the art.

The data packet buffer 100 includes a write interface 122 and a read interface 124. The write interface 122, according to various embodiments, is configured to have a data width greater than the data width of the locations within the memory banks 120a-1. For such embodiments, the data packet buffer 100 is configured to segment each of the one or more incoming data elements received on the write interface 122 into one or more storage data elements. A storage data element having a data width equal to or less than the data width of the locations in the memory banks 120a-1. Further, the data packet buffer 100 is configured to store the storage data elements for each incoming data elements sequentially in columns 110, 112, 114 of the packet data buffer 100. For example, the first storage data element of a first incoming data element would be stored into any one of the memory banks 120a-d in the first column of the memory banks 110. The second storage data element of the first incoming data element would be stored in any one of the memory banks 120e-h in the second column of the packet data buffer 100. The data packet buffer 100 would continue to write the storage data elements of the first incoming data element sequentially into the next packet data buffer 100. For various embodiments, if the data packet buffer 100 reaches the last column 114, the data packet buffer 100 wraps back to the first column 110 for storing additional storage data elements of the first incoming data element. Moreover, the packing data buffer 100 is configured to write the storage data elements into the memory banks 120a-1 in the columns 110, 112, 114 in parallel. One skilled in the art would understand that the various embodiments are not limited to writing the first incoming data element to the first column 110. The packet data buffer 100 is configured to write a first storage data element of an incoming data element in any column 110, 112, 114 and the subsequent storage data elements in the next column in the sequence using the techniques describe herein. Thus, the packet data buffer is configured to handle incoming data elements of any width in an efficient manner.

Moreover, the write interface 122, for various embodiments, is configured to receive one or more incoming data elements from multiple sources at a time. The data packet buffer 100 is configured to store the sequence of storage data elements for each incoming data element from a different source sequentially in consecutive columns 110, 112, 114 as described herein. For various, embodiments, each incoming data element received from the same source is stored sequentially in consecutive columns 110, 112, 114 using techniques herein. For example, a first incoming data element received from a first source would be written sequential in consecutive columns 110, 112, 114 as described herein and a first storage data element of a second incoming data element received from the same source would be written in the next consecutive column 110, 112, 114 after the column 110, 112, 114 used to store the last storage data element of the first incoming data element.

The data packet buffer 100 also includes a read interface 124 having a read interface width. The read interface width may be the same width of a different width from the write interface 122. The read interface 124 is configured to read out in parallel a storage data element from each column 110, 112, 114 of the packing data buffer 100. For an embodiment the memory system is configured to perform a read of a storage data element out of one or more columns 110, 112, 114 of the packet data buffer, where each storage data element is part of the same outgoing data element and all the reads are to sequential storage data elements in the outgoing data element.

Figure 3:
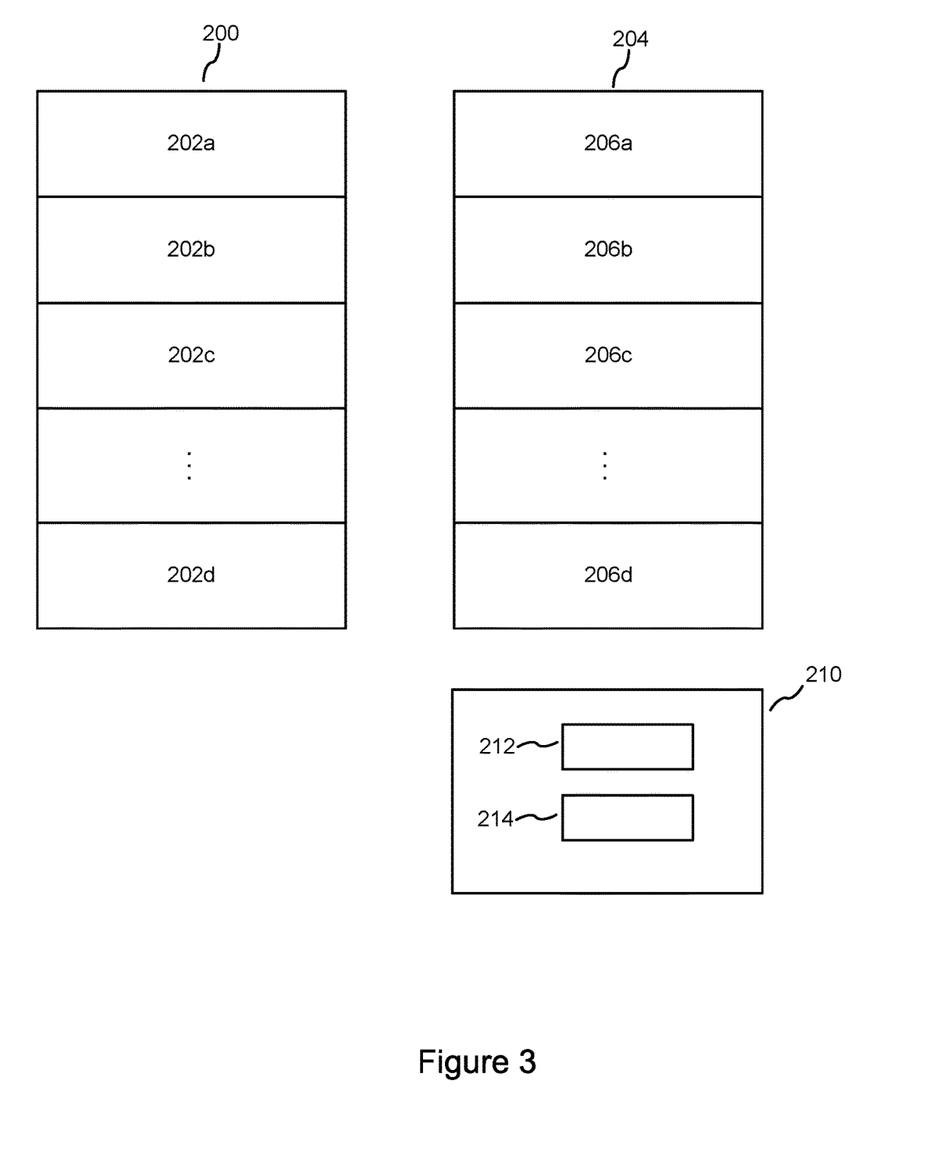
FIG. 3 illustrates a block diagram of a portion of a memory system according to an embodiment.

FIG. 3 illustrates a block diagram of a portion of a memory system according to an embodiment. The portion of a memory system includes a memory bank 200 of a packet data buffer, a link memory 204, and a context manager 210. The memory bank 200 includes one or more locations 202a-d for storing storage data elements of one or more incoming data elements. An incoming data element and outgoing data element includes, but is not limited to, a data packet or a cell of a data packet. As is known in the art, a data packet may be split up into a plurality of cells.

These locations 202a-d are accessed using addresses associated with each of the one or more locations 202a-d using techniques including those known in the art. The link memory 204 also includes locations 206a-d for storing metadata to generate one or more lists. For example, the processor 16 is configured to write metadata into the locations 206a-d that interconnect the locations in the memory banks of the packet data buffer to form entries in the list. The list maintains an order of the sequence that the storage data elements were stored in the packet data buffer. This provides the memory system the ability to read the storage data elements out of the packet data buffer in the proper sequence. The order may be based on one or more of first-in, first out (FIFO), priority, or other criteria including those known in the art for network devices.

For an embodiment, the link memory 204 is configured to store metadata, such as one or more pointers, used to interconnect entries to form one or more lists of the storage data elements stored in the packet data buffer. For an embodiment, metadata such as a pointer is stored in the link memory 204 specifies the address of a location within the link memory 204 of the next entry in the list. In addition to a pointer, a location 206a-d in the link memory 204 includes, according to an embodiment, other metadata including, but not limited to, a sequence identifier (e.g., a data-element sequence identifier) and the addresses of locations in the packet data buffer for a set of one or more storage data elements. A sequence identifier denotes the order or sequence that storage data elements are to be read from the packet data buffer. For an embodiment, a data-element sequence identifier is based on the order the storage data elements were received at a network device. Moreover, the link memory 204 is configured to store the address in a location 206a-d of the link memory 204 for the location 202a-d in memory bank 200 of the packet data buffer which a storage data element was stored.

The embodiment illustrated in FIG. 3 also includes a context manager 210. The context manager 210 is configured to maintain metadata for one or more lists, where each list includes one or more storage data elements. Specifically, the context manager 210 includes a head entry 212 and a tail entry 214 configured to store metadata for the head or first entry of a list and the tail or the last entry of the list. The metadata for the head and the tail, for an embodiment, is stored in one or more registers. However, one skilled in the art would understand that other memory technologies could be used including those described herein. The metadata stored in the head entry 212 includes the address of the location 202a-d in the memory bank 200 of the packet data buffer where the first entry of a list is stored. The metadata stored in the head entry 212 also includes a pointer to the location 206a-d of the next entry in a list. For example, the pointer is an address to a location 206a-d in the link memory 204 that is the next entry in the list. In addition, the head entry 212 may include a data-element sequence identifier of the storage data element. The tail entry 214 includes one or more of the type of metadata described above, but for the last entry in a list. For an embodiment, one or more processors are used to update, overwrite, and invalidate the metadata in the head entry 212 and the tail entry 214 as incoming data elements are stored in the packet data buffer or outgoing data elements are read from the packet data buffer.

Figure 4:
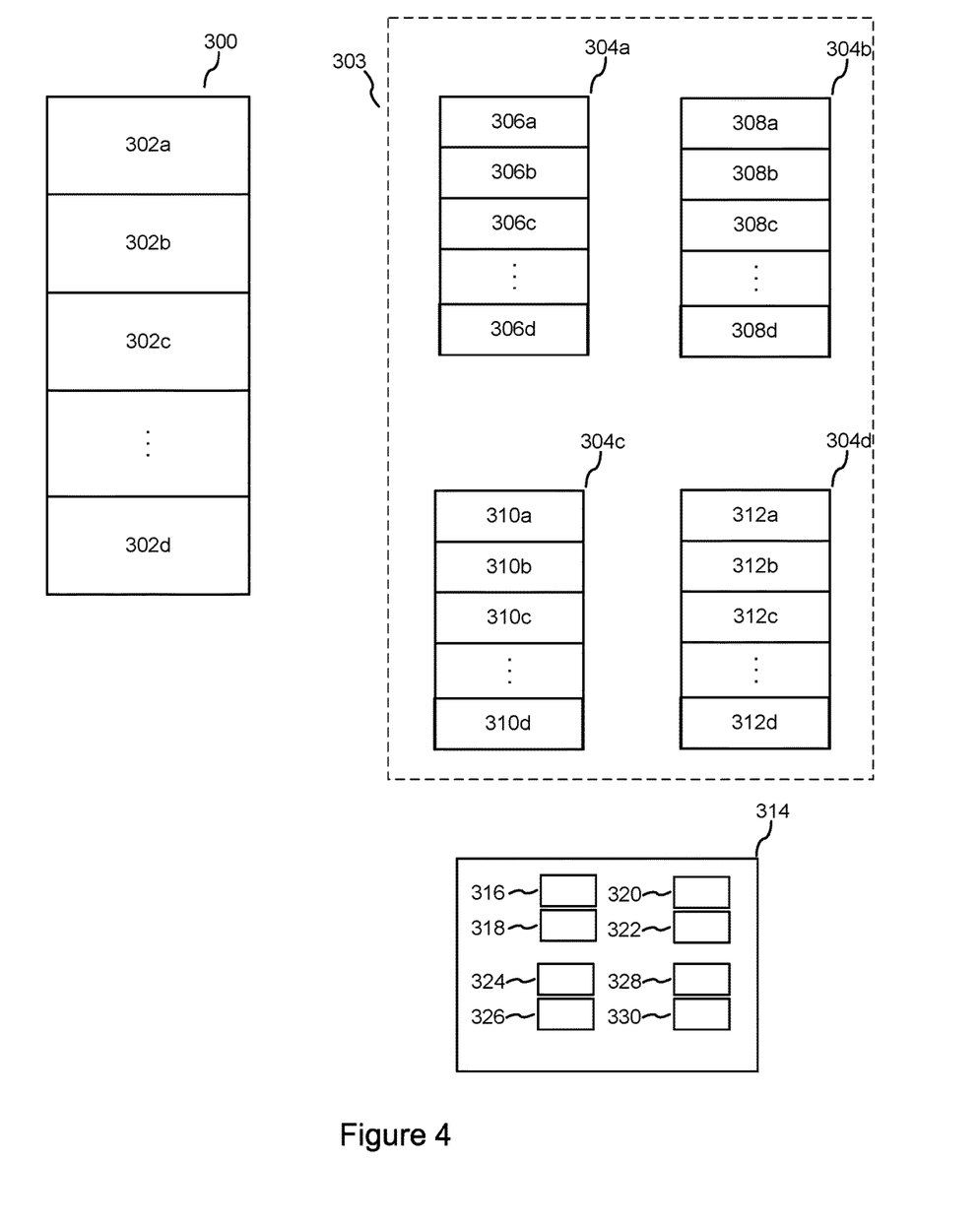
FIG. 4 illustrates a block diagram of a portion of a memory system including multiple banks of distributed-linked list memory according to an embodiment.

FIG. 4 illustrates a block diagram of a portion of a memory system including multiple banks of distributed-linked list memory according to an embodiment. The portion of a memory system includes a memory bank 300 of a packet data buffer, a link memory 303, and a context manager 314. The memory bank 300 may be implemented using techniques described herein. The link memory is formed from an array of memory elements, such as memory banks 304a-d. For an embodiment, each memory bank 304a-d is a single port memory that provides a single access per clock cycle. As illustrated in FIG. 3, the embodiment includes a first memory bank 304a including locations 306a-d, a second memory bank 304b including locations 308a-d, a third memory bank 304c including locations 310a-d, and a fourth memory bank 304d including locations 312a-d. As described above, the link memory is configured to store metadata including pointers to reference to the address of the location of storage data elements stored in the packet data buffer.

As illustrated in FIG. 4, the embodiment also includes a context manager 314. Context manager 314 includes multiple tail and head entries. Specifically, the context manager 314 includes a first head entry 316 and a first tail entry 318 for the first bank of link memory 304a, a second head entry 320 and a second tail entry 322 for the second bank of link memory 304b, a third head entry 324 and a second tail entry 326 for the third bank of link memory 304c, and a fourth head entry 328 and a fourth tail entry 330 for the fourth bank of link memory 304d. Each set of tail and head entries maintains metadata for the first and last entry of a list, respectively, for each bank. That is, the first head entry 316 maintains metadata for the first entry stored in the first bank 304a and the first tail entry 318 maintains metadata for the last entry stored in the first bank 304a. The second head entry 320 maintains metadata for the first entry stored in the second bank 304b and the second tail entry 322 maintains metadata for the last entry of a list stored in the second bank 304b. The third head entry 324 maintains metadata for the first entry of a list stored in the third bank 304c and the third tail entry 326 maintains metadata for the last entry of the list stored in the third bank 304c. The fourth head entry 328 maintains metadata for the first entry of a list stored in the fourth bank 304d and the fourth tail entry 330 maintains metadata for the last entry of the list stored in the fourth bank 304d. Each head and tail entry is configured to store metadata including metadata described herein. Together the lists of each bank 304a-d are used to generate a complete list that interconnects the storage data elements stored in the packet data buffer.

For an embodiment, a processor is configured to assign a data-element sequence identifier to a storage data element. The data-element sequence identifier is assigned to a storage data element or a set of storage data elements to indicate the order in which the storage data element or the set of storage data elements was received. The data-element sequence identifier is stored as metadata in the location of the link memory as described herein. In addition, the data-element sequence identifier is stored in a head entry and tail entry if the corresponding storage data element of the incoming data element stored in the packet data buffer is the head of a list in a bank or a tail of a list in a bank.

For an embodiment including multiple banks of link memory, such as the embodiment illustrated in FIG. 4, the memory system is configured to determine the next element in a list by comparing data-element sequence identifiers assigned to the storage data elements. A memory system configured to determine the next element includes a processor configured to read the head entries 316, 320, 324, and 328 stored for each bank 304a-d in the link memory 303. The processor compares the data-element sequence identifiers stored in all of the head entries 316, 320, 324, and 328 to determine which of the storage data elements is next in a list. For an embodiment, the lowest data-element sequence identifier is a numerical value assigned such that the lowest numerical value can be used to determine the next storage data element in a list; however, the system is not limited to using the lowest data-element sequence identifier as an indicator. A data-element sequence identifier, according to an embodiment, is assigned to a storage data element upon arrival to the network device. Once the processor determines the next storage data element in the list, the processor is configured to retrieve the address of the location 302a-d of the packet data buffer where the storage data element is stored. For an embodiment, a processor is configured to retrieve the address from the head entry 316, 320, 324, and 328 having the lowest data-element sequence identifier. A processor is further configured to use the retrieved address to read the storage data elements out of the packet data buffer.

For an embodiment, a processor is configured to update the metadata of a storage data element read out of the packet data buffer that is stored in the head entry. The processor is configured to use the address of the location in the link memory 303 that stores the next entry in the list for the bank 304a-d. A processor is also configured to update a tail entry 318, 322, 326, and 330 for a bank 304a-d when a new entry is added to the list for the bank 304a-d in response to a new storage data element being stored in the packet data buffer.

For various embodiments, the link memory described herein is configured to generate one or more lists including one or more strides. A stride is generated by the link memory by assigning a sequence identifier to a set of one or more storage data elements associated with the incoming data elements received. The metadata including the sequence identifier for each of the set of one or more storage data elements of the plurality of storage data elements received and the addresses of the locations for all of the storage data elements of the incoming data elements. The metadata is maintained by the distributed-linked list using techniques including those described herein. For various embodiments, the distributed-linked list is configured to generate a list including a plurality of strides bound to the same destination using techniques including those described herein.

Generating a list including one or more strides reduces the number of linking resources required to address the entire packet data buffer. Further, the use of strides reduces the overhead and linking bandwidth access needed since the address information for a plurality of storage data element is contained in a stride, which requires a single linking access request.

As described above, a free address manager is used to generate a buffer available bank set for storing storage data elements of one or more incoming data elements in the packet data buffer. For various embodiments, the free address manager is configured to generate a buffer available bank set that includes one or more locations in each of the memory banks such that an access conflict will not occur. An access conflict would occur if a read or write access to a memory bank is required beyond the capabilities of a memory bank of the packet data buffer. For example, a packet data buffer including memory banks having a single access port would be limited to either one read or write per clock cycle. Further, access constraints may be used to maximize bandwidth and memory utilization of the packet data buffer.

For various embodiments, a free address manger generates a buffer available bank set including those locations in the packing data buffer that are not in a memory bank scheduled for a write access or a read access during a same clock cycle. Thus, in an embodiment using memory banks with a single access port, a free address manager would be configured to exclude locations of a memory bank scheduled for a read or write in a clock cycle from the buffer available bank set. A free address manager may also be configured to determine read/write access availability for memory banks including more than a single access port. A free address manager is configured to determine the availability of a memory bank based on techniques known in the art including, but not limited to, a request bit/flag set, a request bus line activated, a scheduling protocol, or other indicator that access to a bank is scheduled or otherwise reserved. The free address manager is also configured to generate a buffer available bank set including one or more sets of available consecutive columns to write storage data elements of the same incoming data element sequentially.

Figure 5:
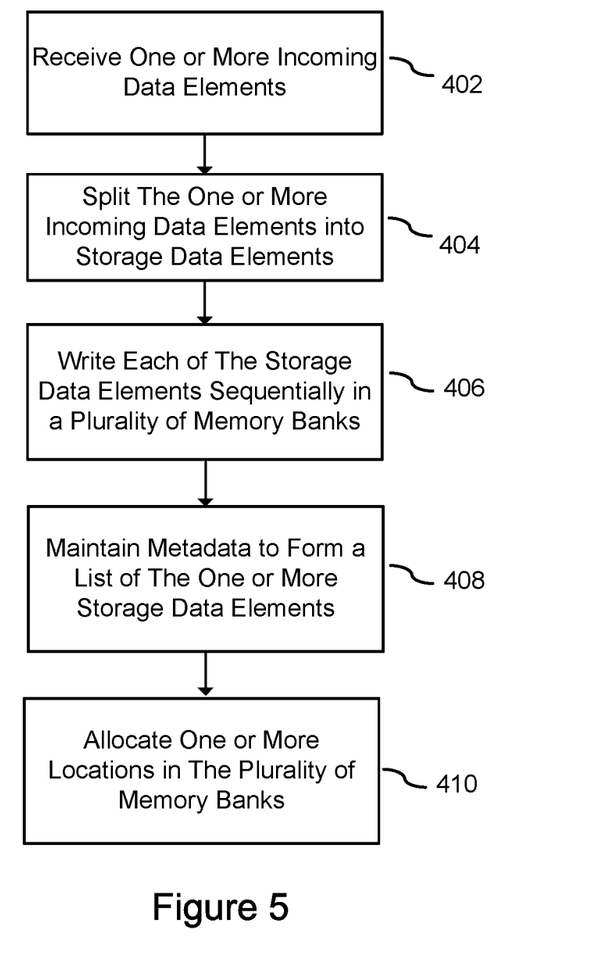
FIG. 5 illustrates a flow diagram for a method for implementing a memory system including a packet data buffer according to an embodiment.

FIG. 5 illustrates a flow diagram for a method for implementing a memory system including a packet data buffer according to an embodiment. The method includes receiving one or more incoming data elements 402. The incoming data elements received may be of different widths and from one or more sources. The method also includes splitting the one or more incoming data elements into one or more storage data elements 404. For example, the incoming data elements are split into one or more storage data elements that do not exceed a data width of the memory banks using techniques including those described herein. Moreover, the method includes writing each of the storage data elements sequentially in a plurality of memory banks 406. For example, the storage data elements are stored sequentially in consecutive columns of a packet data buffer including a plurality of memory banks using techniques including those described herein.

Further, the method includes maintaining metadata to interconnect the one or more storage data elements 408. For example, maintaining metadata to interconnect the one or more storage data elements includes storing and updating one or more pointers and other metadata using techniques including those described herein. The method also includes allocating one or more locations in the plurality of memory banks 410. For example, allocating one or more locations in the plurality of memory banks includes selecting a location from a buffer available bank set of locations and setting a pointer to reference the address of that location using techniques including those describe herein.

Embodiments described herein may be implemented using one or more of a semiconductor chip, ASIC, FPGA, and using discrete components. Moreover, elements of the memory system may be implemented as one or more cores on a semiconductor chip, such as a system on a chip ("SoC"). Embodiments described herein may also be implemented on a machine, such as a network device and one or more computer systems, including a program storage device. The program storage device includes, but is not limited to, one or more of any of mass storage that is remotely located from the machine, random access memory, non-volatile memory, magnetic or optical storage disks, and other computer readable storage mediums.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A memory system for a network device, the memory system comprising:
   a first network interface configured to receive network data in units of a first data width;
   a second network interface configured to receive network data in units of a second data width different from the first data width;
   a third network interface configured to output network data in units of a third data width;
   a packing data buffer including a plurality of memory banks arranged in a plurality of rows and a plurality of columns, the packing data buffer configured to store, in the plurality of memory banks, received network data of the first data width or the second data width as storage data elements in units of a fixed data width, wherein the third data width of the third network interface is a multiple of the fixed data width;
   a free address manager configured to generate an available bank set that includes one or more free memory banks in the plurality of memory banks; and
   distributed link memory configured to maintain one or more pointers to interconnect a set of one or more memory locations of the plurality of memory banks in the packing data buffer to generate at least one list to maintain a sequential relationship between the network data stored in the plurality of memory banks.

2. The memory system of claim 1, wherein the packing data buffer is configured to access a plurality of storage data elements simultaneously.

3. The memory system of claim 2, wherein at least one access is a read access.

4. The memory system of claim 1, wherein the third data width is different from the first data width and different from the second data width.

5. The memory system of claim 4, wherein the received network data of the first data width or the second data width is split into one or more sets of storage data elements of the fixed data width.

6. The memory system of claim 1, further configured to prevent a simultaneous write operation and a read operation to a same memory bank of the plurality of memory banks during a same clock cycle.

7. The memory system of claim 1, further configured to write a plurality of storage data elements corresponding to the network data received from one of the first network interface or the second network interface sequentially across the plurality of columns.

8. The memory system of claim 7, wherein the distributed link memory further includes a plurality of link memory banks, each link memory bank of the plurality of link memory banks is configured to maintain one or more pointers to interconnect a set of one or more memory locations of the plurality of memory banks in the packing data buffer to generate the at least one list, the list including one or more sequence identifiers associating storage elements in the set of one or more memory locations to one of the first network interface or the second network interface; and
   a context manager including a plurality of head entries and a plurality of tail entries for each memory bank of the plurality of link memory banks, the context manager configured to maintain metadata for a first entry of the at least one list.

9. The memory system of claim 1, wherein the available bank set includes a free memory bank list for each of the plurality of memory banks.

10. The memory system of claim 1, wherein the third data width is same as the first data width or the second data width.

11. The memory system of claim 1, wherein the third network interface is configured to read a plurality of storage data elements across the plurality of columns of the packing data buffer in parallel, the plurality of storage data elements read in parallel corresponding to a same instance of received network data.

12. A method for implementing a memory system in a network device, the method comprising:
receiving, through a first network interface, network data in units of a first data width;
receiving, through a second network interface, network data in units of a second data width different from the first data width;
splitting the network data of at least one of the first data width or the second data width into a plurality of storage data elements, in units of a fixed data width, wherein a third data width that is used to output network data through a third network interface is a multiple of the fixed data width;
writing each of the plurality of storage data elements sequentially in a plurality of memory banks arranged in a plurality of columns; and
maintaining a sequential relationship between the network data stored in the plurality of memory banks using one or more pointers that interconnect one or more memory locations of the plurality of memory banks using a plurality of link memory banks.

13. The method of claim 12, wherein the plurality of memory banks further includes a plurality of rows.

14. The method of claim 13, further comprising:
generating an available bank set that includes one or more locations in the plurality memory banks that are not currently used to store a storage data element.

15. The method of claim 14, wherein generating the available bank set includes removing a particular memory bank from the available bank set if the particular memory bank is scheduled for any one of a read access or a write access.

16. The method of claim 12, further comprising:
allocating one or more locations in at least one memory bank of the plurality of memory banks; and
maintaining metadata to form at least one data-element list of one or more storage data elements of the plurality of storage data elements using a plurality of head entries and a plurality of tail entries for a set of memory banks in the plurality of memory banks.

17. The method of claim 12, further comprising:
reading from a read set of the plurality of the memory banks in parallel.

18. The method of claim 17, wherein the read set includes a plurality of memory banks arranged in sequential columns of the plurality of columns.

19. The method of claim 18, wherein the read set includes a plurality of storage data elements for one of the network data of the first data width or the network data of the second data width.

20. The method of claim 19, wherein reading from a read set of the plurality of the memory banks in parallel is in response to receiving a first pointer of the one or more pointers, the first pointer corresponding to a first entry of the plurality of storage data elements.

21. The method of claim 12, further comprising:
generating at least one list using the one or more pointers, the at least one list including one or more sequence identifiers associating storage data elements in the one or more memory banks to one of the first network interface or the second network interface; and
maintaining metadata for a first entry of the at least one list using a context manager that includes a plurality of head entries and a plurality of tail entries for each link memory bank of the plurality of link memory banks.

22. A memory system for a network device, the memory system comprising:
a first means for receiving network data in units of a first data width;
a second means for receiving network data in units of a second data width;
a means for splitting the network data of at least one of the first data width or the second data width into a plurality of storage data elements in units of a fixed data width, wherein a third data width that is used to output network data is a multiple of the fixed data width;
a means for writing each of said plurality of storage data elements sequentially in one or more memory banks arranged in a plurality of columns; and
a means for maintaining a sequential relationship between the network data stored in the one or more memory banks using one or more pointers that interconnect the plurality of storage data elements using a plurality of link memory banks.

* * * * *